N. BURNHAM.
Staple-Hook.

No. 202,786.  Patented April 23, 1878.

Attest:
Jno. P. Brooks.
August Petersohn.

Inventor:
Nathaniel Burnham,
by Louis Bagger & Co.
Attys.

UNITED STATES PATENT OFFICE.

NATHANIEL BURNHAM, OF AMBOY, ILLINOIS.

IMPROVEMENT IN STAPLE-HOOKS.

Specification forming part of Letters Patent No. 202,786, dated April 23, 1878; application filed January 7, 1878.

*To all whom it may concern:*

Be it known that I, NATHANIEL BURNHAM, of Amboy, in the county of Lee and State of Illinois, have invented certain new and useful Improvements in Staple-Hooks; and I do hereby declare that the following is a full, clear, and exact description thereof, which will enable others skilled in the art to which it appertains to make and use the same, reference being had to the accompanying drawings which form a part of this specification, and in which—

Figure 1:
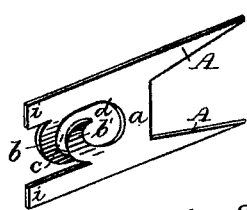
Figure 3:
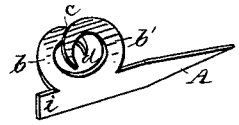
Figure 2:
Figure 5:
Figure 4:
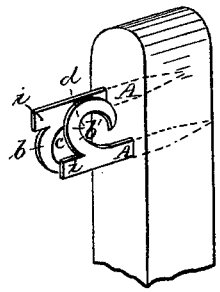
Figure 6:
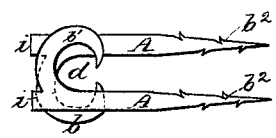
Figure 7:
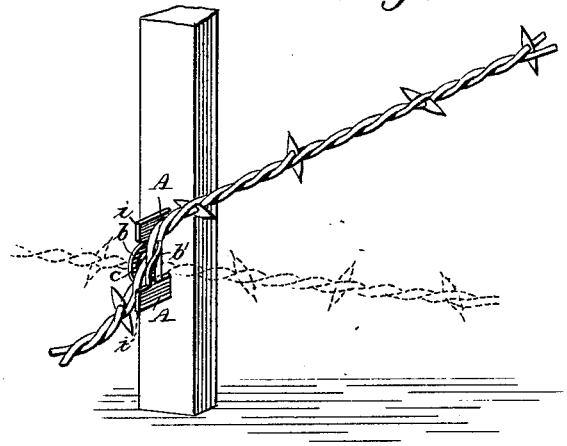

Figure 1 is a perspective view of my improved staple-hook. Fig. 2 is a plan view. Figs. 3 and 4 show, in perspective, two modifications of my invention. Figs. 5 and 6 represent plan views thereof; and Fig. 7 is a perspective view illustrating the method of securing a fence-wire to a post with my improved staple, the dotted lines showing the position of the wire when inserted into the hook.

Similar letters of reference denote corresponding parts in all the figures.

This invention has reference to an improved staple-hook by which fence-wires may be more readily and conveniently secured to the posts than with the staples now generally used, substantially as I shall now proceed more fully to describe.

In the drawing, A A are the shanks of my improved staple, which are pointed so as to be readily driven into a fence-post. They are connected by a strip, $a$, and a hook, $b$, is formed near the end of one of them, as shown. Another hook, $b^1$, is formed upon the other shank, extending upward and outward from the strip $a$. The two hooks $b$ $b'$ are then swisted in opposite directions, so as to leave a space, $c$, between them, through which the wire may be readily inserted into the eye $d$. The ends of the shanks A A project beyond the hooks, thus forming shoulders $i$ $i$, for convenience in driving the hooks.

The method of using my improved staple-hook will be readily understood by reference to Fig. 7 of the drawings. After driving it into the post, the wire is inserted into the eye $d$, by passing it, while held in the inclined position shown in dotted lines, through the slot or opening $c$, and then turning it to the position shown in full lines, when it will be held securely in position, but in such a manner that it may be easily removed, when desired, by reversing this operation. The hooks may be forced together, after inserting the wire, in order to absolutely prevent it from coming out by accident, but this will, as a rule, not be necessary.

In Figs. 3 and 4 I have shown a modification of my invention, which consists in dispensing with one of the shanks A, and forming both of the hooks $b$ $b^1$ upon the same shank. The operation in this case is the same as before. The other modification, shown in Figs. 5 and 6, consists in omitting the connecting-strip $a$, and having the shanks separate, with a hook formed upon each. In this case they are driven into the post with the hooks facing each other, thus forming an eye, into which the wire may be inserted in the same manner as before described.

When desired, more than two hooks may be formed upon the shanks A A, and the latter may be barbed, as shown in the drawings at $b^2$ $b^2$, but this is not necessary nor always desirable.

The advantages of my improved staple-hook will be readily seen from the foregoing description, taken in connection with the drawings hereto annexed. It may be used for all purposes to which staples, as ordinarily constructed, are applied. It is especially convenient for attaching wires to posts, and, in the case of barbed fence-wire, the wire may be drawn through the staple by simply turning or twisting it while drawing, when the barbs will pass through the opening $c$, between the hooks.

Having thus described my invention, I claim and desire to secure by Letters Patent of the United States—

The improved staple-hook herein described, formed of the shanks A A, connected by the strip $a$, and having hooks $b$ $b^1$ facing each other, and with their points twisted or turned in opposite directions, and having shoulders $i$ $i$ projecting beyond the hooks, for convenience in driving, substantially as and for the purpose herein shown and specified.

In testimony that I claim the foregoing as my own I have hereto affixed my signature in presence of two witnesses.

NATHANIEL BURNHAM.

Witnesses:
CHESTER BADGER,
RUSH D. BADGER.